United States Patent [19]

Tashiro

[11] 4,437,991

[45] Mar. 20, 1984

[54] FILTER APPARATUS

[75] Inventor: Minoru Tashiro, Tokyo, Japan

[73] Assignee: Bunri Industry Co., Ltd., Tokyo, Japan

[21] Appl. No.: 371,270

[22] Filed: Apr. 23, 1982

[30] Foreign Application Priority Data

Apr. 28, 1981 [JP] Japan ............................. 56-64726

[51] Int. Cl.³ ............................................. B01D 25/38
[52] U.S. Cl. ............................................. 210/413
[58] Field of Search ............... 210/332, 334, 407, 408, 210/413–415

[56] References Cited

U.S. PATENT DOCUMENTS

| | | | |
|---|---|---|---|
| 2,412,400 | 12/1946 | Hock | 210/332 X |
| 2,598,322 | 5/1952 | Vokos | 210/332 X |
| 2,861,688 | 11/1958 | Harms | 210/408 X |
| 2,865,509 | 12/1958 | Harlan | 210/414 X |
| 2,919,806 | 1/1960 | Hock et al. | 210/414 |
| 2,994,434 | 8/1961 | Moseres | 210/413 |
| 3,194,399 | 7/1965 | Harms | 210/413 X |
| 3,221,885 | 12/1965 | Hirs | 210/332 X |
| 3,748,835 | 7/1973 | Panzica | 210/413 X |

FOREIGN PATENT DOCUMENTS

| | | | |
|---|---|---|---|
| 377273 | 9/1907 | France | 210/413 |
| 1361317 | 4/1964 | France. | |
| 2237664 | 2/1975 | France. | |
| 919471 | 2/1963 | United Kingdom | 210/408 |

*Primary Examiner*—Robert H. Spitzer

[57] ABSTRACT

A filter apparatus for filtering a liquid containing solid materials comprises a filter member made of a flexible sheet having a number of through holes which prevent passage of solid materials while allow passage of the liquid thereby filtering the liquid, first wipers which are slidably arranged over the surface of the filter member at the liquid inlet side and which scrape off the solid materials deposited on the surface of the filter member upon sliding movement thereof; second wipers which are slidably arranged over the surface of the filter member at the liquid outlet side; and driving mechanism for sliding the first and second wipers on the surfaces of the filter member at the same speed in the same direction so that the first and second wipers oppose each other with the filter member disposed therebetween.

23 Claims, 6 Drawing Figures

FILTER APPARATUS

BACKGROUND OF THE INVENTION

The present invention relates to a filter apparatus for filtering a liquid containing solid materials, such as cutting oil and machining oil, so as to separate these solid materials from the liquid.

At factories, used cutting oil or machining oil contains a large quantity of chips and abrasive grains. In order to put such cutting oil or machining oil to reuse, the chips or abrasive grains must be separated from it. A filter apparatus is widely known as an apparatus which separates solid materials such as chips from a liquid such as cutting oil.

The filter apparatus generally has a filter with a number of through holes. Filtration performance is improved as these through holes are smaller. However, if the holes are smaller, they are easily clogged, resulting in a great decrease in the filtration rate of the liquid. In order to prevent such clogging, the filter must be frequently cleaned.

SUMMARY OF THE INVENTION

The present invention has been made in consideration of this and has for its object to provide a filter apparatus which is improved in filtration performance and which does not easily cause clogging of the filter so that the apparatus may be used over a prolonged period of time.

According to an aspect of the present invention, there is provided a filter apparatus comprising a filter member which comprises a flexible sheet and which filters a liquid, the flexible sheet having a number of through holes which prevent passage of solid materials while allow passage of the liquid; a first wiper means which is slidably arranged over the surface of the filter member at the liquid inlet side and which scrape off the solid materials deposited on the surface of the filter member upon sliding movement thereof; a second wiper means which is slidably arranged over the surface of the filter member at the liquid outlet side; and driving means for sliding the first and second wiper means over the surfaces of the filter member at the same speed in the same direction so that the first and second wiper means oppose each other with the filter member disposed therebetween.

The filter apparatus of the present invention has the first and second wiper means which slide over the surfaces of the filter member. Thus, the solid materials deposited on the surface of the filter member are scraped off, so that clogging of the filter member may be prevented and the diameter of the through holes may be made smaller. Since the first and second wiper means slide over the surfaces of the filter member so that they oppose each other with the filter member disposed therebetween, the filter member may not be deformed (bent or the like) by the sliding movement of the wiper means. For this reason, the filter apparatus of the present invention is improved in filtration performance, prevents clogging of the filter member, and can be used over an extended period of time.

BRIEF DESCRIPTION OF THE DRAWINGS

FIGS. 1 to 4 show a filter apparatus according to an embodiment of the present invention, in which FIG. 1 is a plan view thereof, FIG. 2 is a longitudinal sectional view along the line II—II of FIG. 1, FIG. 3 is a cross-sectional view along the line III—III of FIG. 1 and FIG. 4 is a partial enlarged view thereof; and FIGS. 5 and 6 show a filter apparatus according to another embodiment of the present invention, in which FIG. 5 is a longitudinal sectional view thereof and FIG. 6 is a partial enlarged view thereof.

DETAILED DESCRIPTION OF THE PREFERRED EMBODIMENTS

Figure 1:
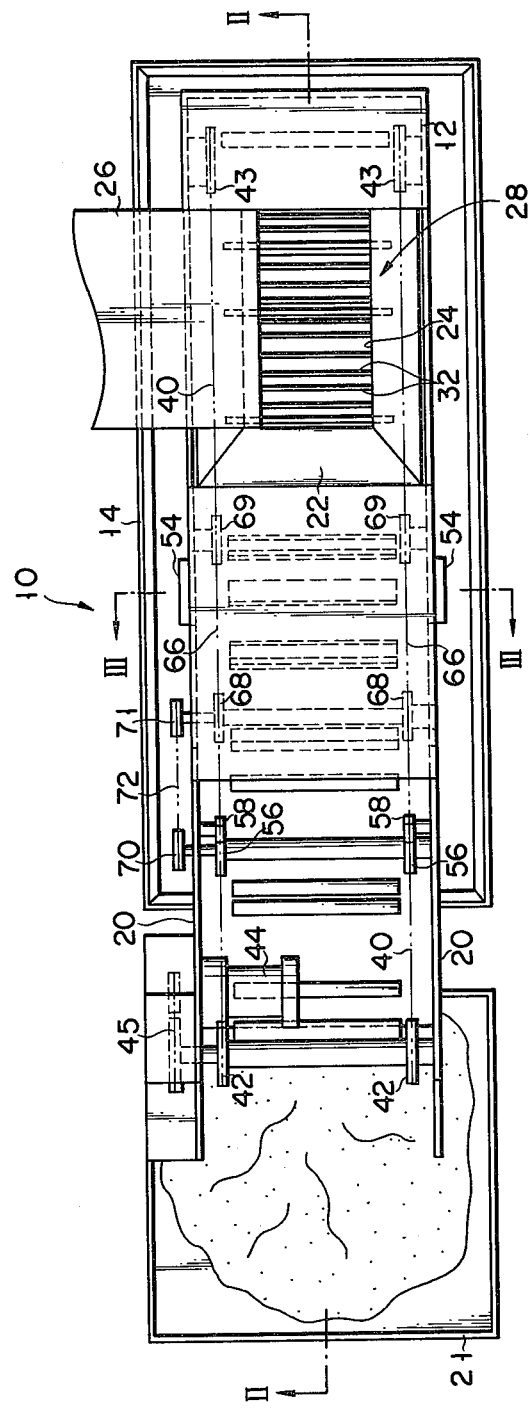
Figure 2:
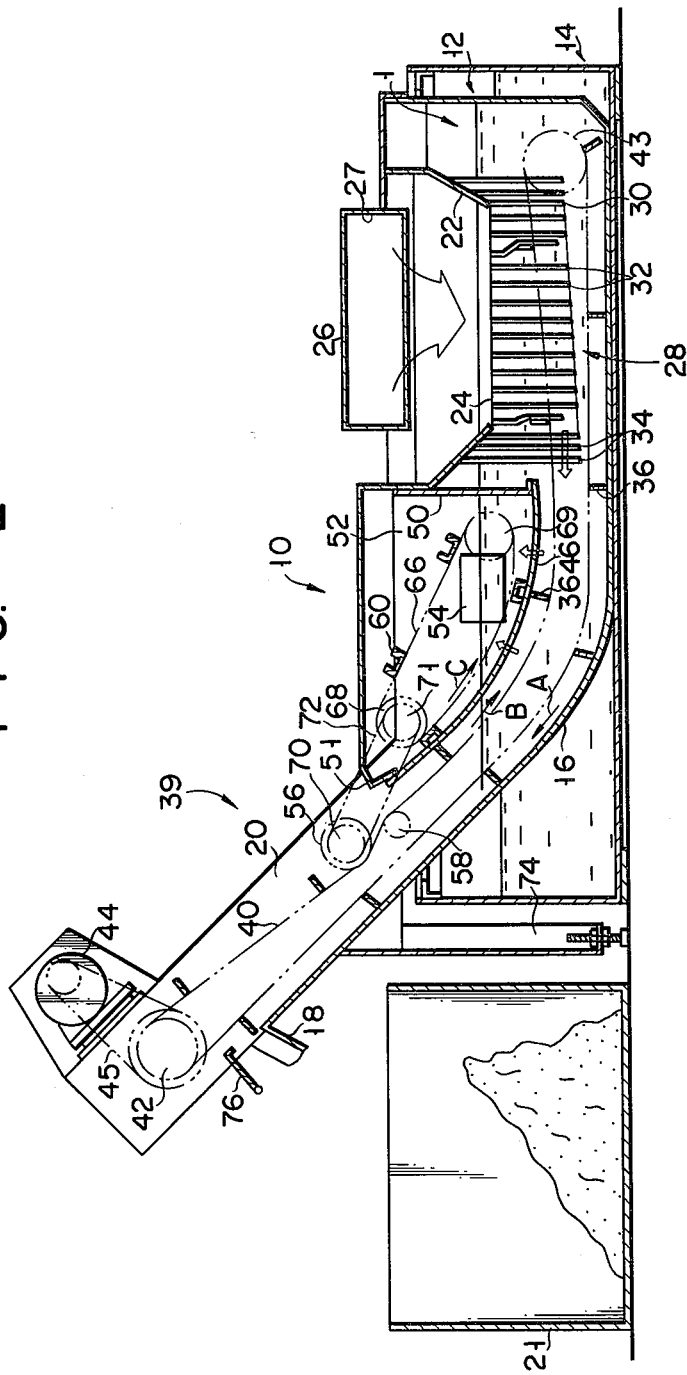
Figure 3:
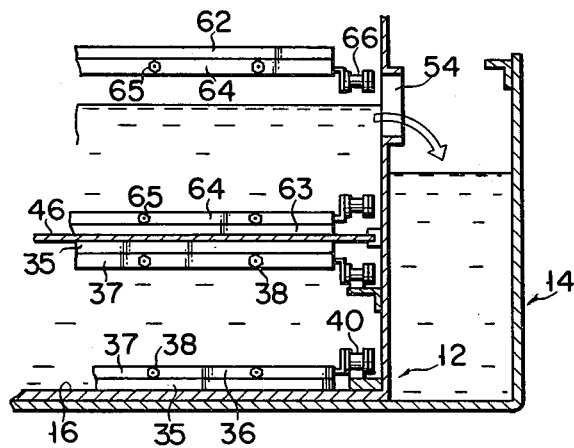
Figure 4:
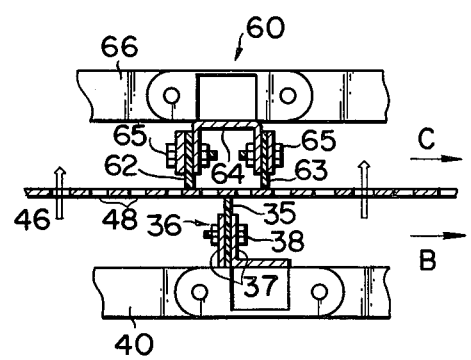

The preferred embodiments of the present invention will now be described with reference to the accompanying drawings.

As shown in FIGS. 1 to 4, a filter apparatus 10 has a separation tank 12 in which a liquid containing solid materials is charged. The separation tank 12 is arranged inside a cleaned liquid storage tank 14. The separation tank 12 has two parallel side walls and a bottom wall 16. One end portion of the bottom wall 16 is inclined to extend toward one upper side of the tank 14 and has a chute 18 at the extended end of the bottom wall. This one end portion of the bottom wall 16 is supported by support frames 20 which extend therealong from the side walls of the separation tank 12, respectively. The support frames 20 are formed integrally with the side walls of the separation tank 12, respectively. A chip box 21 is arranged outside the tank 1 and below the chute 18.

A hopper 22 is mounted on the side walls of the separation tank 12. The hopper 22 has an inlet port 24 at its lower end. An opening 27 of an oil pipe 26 extending, for instance, from a cutting machine is located above the hopper 22. Cutting oil containing chips, which is delivered from the cutting machine by way of the oil pipe 26, is supplied to the hopper 22 through the opening 27. The cutting oil supplied to the hopper 22 is then supplied to the separation tank 12 through the inlet port 24. A straightening filter 28 depends from the hopper 22, and is made of a foamed resin such as urethane sponge. The straightening filter 28 has a cylindrical filter 30 arranged to surround the inlet port 24, a plurality of partition filters 32 dividing the interior of the cylindrical filter 30, and a plurality of turbulence preventive filters 34 arranged on the outer circumference of the cylindrical filter 30. The cutting oil supplied through the inlet port 24 flows down inside the cylindrical filter 30. Thus, the cutting oil is straightened downward by the partition filters 32. Bounce of the cutting oil inside the separation tank 12 caused by the falling energy of the cutting oil is reduced by the partition filters. The bounce of the cutting oil is prevented to transmit to the outside by the cylindrical filter 30 and the turbulence preventive filters 34. In this manner, the cutting oil supplied to the separation tank 12 smoothly flows down inside the cylindrical tank 12. During this process, chips of relatively big size contained in the cutting oil precipitate by their own weight and are deposited on the bottom wall 16 of the separation tank 12. Part of the cutting oil flowing down inside the cylindrical filter 30 is diffused into the separation tank 12 through the cylindrical filter 30, the partition filters 32 and the turbulence preventive filters 34. The chips of intermediate size contained in the cutting oil are trapped by the filters when the cutting oil is filtered thereby. The chips of small size which are not trapped by the cylindrical filter 30, the partition filters 32, and the turbulence preventive filters 34 float in the cutting oil held in the separation tank 12 or are deposited on the bottom wall 16 by their own weight.

The filter apparatus 10 has a plurality of first wipers 36 which are slidable on the bottom wall of the separation tank 12. Each wiper 36 has oil-resistant rubber plate 35 of a length equal to the width of the bottom wall. The oil-resistant rubber plate 35 is mounted on plate-shaped support members 37 by bolts 38. Each support member 37 has a length greater than that of the rubber plate 35, and its opposite ends project from the rubber plate. Each wiper 36 is mounted on a pair of first wiper chains 40. More particularly, both ends of each support member 37 are mounted to the respective the wiper chains 40. The wiper chains 40 are passed round a pair of drive sprockets 42 which are rotatably mounted on the respective inner surfaces of the support frames 20, and a pair of driven sprockets 43 which are rotatably mounted on the respective inner surfaces of side walls of the separating tank 12. The drive sprockets 42 are coupled with each other. The wiper chains 40 extend along the bottom wall 16. The forward movement paths of the wiper chains 40 extend parallel to the bottom wall 16. One of the drive sprockets 42 is coupled through a drive chain 45 to a motor 44 which is mounted at one of the extended end portions of the support frames 20. By the normal rotation or intermittent rotation of the motor 44, the wiper chains 40 are driven in the direction indicated by arrow A in FIG. 2 along the longitudinal direction of the separation tank 12. The first wipers 36 are mounted on the wiper chains 40 at a predetermined pitch along the direction of movement of the wiper chains 40 and perpendicularly thereto. When the wiper chains 40 are driven in the direction indicated by arrow A, the first wiper 36 at the sides of the forward movement paths thereof are slid on the bottom wall 16 of the separation tank 12 along the direction indicated by arrow A. When the first wipers 36 are slid on the bottom wall 16, the chips deposited on the bottom wall are scraped by these wipers and are transferred to a chute 18 along the bottom wall to be discharged therethrough. The discharged chips are dropped in the chip box 21.

The backward movement paths of the respective wiper chains 40 extend above the lower edges of the cylindrical filter 30, the partition filters 32 and the turbulence preventive filters 34. When the first wipers 36 are driven along the backward movement paths of the wiper chains 40, they are brought into contact with the lower edges of the respective filters 30, 32 and 34. Due to the impact of this contact, the filters 30, 32 and 34 are swung and the chips deposited on these filters are thus separated therefrom. In this manner, clogging of the respective filters 30, 32 and 34 is prevented. The chips dropped from the filters 30, 32 and 34 are either deposited on the bottom wall 16 or float in the cutting oil held in the separation tank 12.

The filter apparatus 10 has a filter member 46 which is arranged inside the separation tank 12. The filter member 46 is made of a flexible sheet with a number of through holes, for example, a punched metal sheet. The filter member is in a rectangular form having a width substantially the same as that of the separation tank 12. Generally the smaller the diameter of the through hole 48 and the thinner the thickness of the filter member 46, the better the filtration efficiency of the filter member 46. In the embodiment of the present invention, the diameter of the through hole 48 of the filter member 46 is set to about 0.5 mm, and the thickness of the filter member 46 is set to about 0.4 mm. The through holes 48 prevent the solid materials from passing therethrough while they allow passage of fluid materials. The two longer sides of the filter member 46 are respectively supported by the side walls of the separation tank 12. The two shorter sides of the filter members 46 are respectively supported by a support plate 50 mounted on the side walls of the separation tank 12 and a support member 51 mounted on the support frames 20. In this manner, the filter member 46 is suspended between the side walls of the separation tank 12 such that it is inclined to be parallel to the bottom wall 16.

Outlet ports 54 are formed in opposition to each other in the side walls of the separation tank 12 to be within a space 52 defined by the filter member 46, the support plate 50, and the side walls of the separation tank 12. The cutting oil held in the separation tank 12 is discharged to the tank 14 through the outlet ports 54. The filter member 46 is arranged so as to separate the outlet ports 54 and the interior of the separation tank 12, that is, to allow the flow path of the cutting oil from the separation tank 12 to the outlet ports 54. Thus, the cutting oil flowing to the outlet ports 54 always passes through the through holes 48 of the filter member 46. Then, the chips in the cutting oil cannot pass through the through holes 48 and are trapped by the filter member 46. The trapped chips are deposited on the surface of the filter member at the liquid inlet side or at the side of the separation tank 12. The cutting oil flowing toward the outlet ports 54 from the interior of the separation tank 12 is filtered by the filter member 46, and is thereafter supplied to the tank 14 through the outlet ports 54.

A pair of transmission sprockets 56 and a pair of guide sprockets 58 are rotatably mounted adjacent to each other on the inner surfaces of the support frames 20, respectively. The transmission sprockets 56 are coupled with each other. These transmission sprockets 56 and guide sprockets 58 are engaged with the first wiper chains 40 at the sides of the backward movement paths thereof. Between the guide sprockets 58 and the driven sprockets 43, the backward movement paths of the wiper chains 40 extend substantially parallel to the filter member 46 at a predetermined pitch. The first wipers 36 which are mounted to the wiper chains 40 for movement therewith are slid, at the sides of the backward movement paths of the wiper chains 40, on the surface of the filter member 46 at the inlet side thereof along the direction indicated by arrow B. Upon the sliding movement of the first wipers 36, the chips which have been deposited on the surface of the filter member 46 at the liquid inlet side are scraped by the first wipers 36. The first wipers 36 also function as scrapers.

The filter apparatus 10 also has a plurality of second wipers 60 which are slidable on the surface of the filter member 46 at the side of the liquid outlet, that is, at the side of the outlet ports 54. Each wiper 60 has two oil-resistant rubber plates 62 and 63, which are mounted to a U-shaped support member 64 with bolts 65 to be parallel to each other. The oil-resistant rubber plates 62 and 63 each have a length substantially equal to the width of the bottom wall 16 of the separation tank 12. The support member 64 has a length greater than that of the rubber plates 62, 63, and its opposite ends project from the rubber plates. Both ends of each support member 64 are mounted to a pair of second wiper chains 66. Inside the space 52, a pair of wiper drive sprockets 68 and a pair of wiper driven sprockets 69 are rotatably mounted on the inner surfaces of the side walls of the separation tank 12. The wiper drive sprockets 68 are coupled with each other. The second wiper chains 66 are passed round these sprockets 68 and 69. The forward movement paths of the wiper chains 66 are parallel to the filter member 46. An interlocking sprocket 70 is coupled to one of the transmission sprockets 56, while another interlocking sprocket 71 is coupled to one of the wiper drive sprockets 68. A transmission chain 72 is passed round these sprockets 70 and 71. The driving force of the scraper chains 40 driven by the motor 44 drives the interlocking sprocket 70 together with the transmission sprocket 56. The driving force of the interlocking sprocket 70 is transmitted to the interlocking sprocket 71 through the transmission chain 72 and thence to the wiper drive sprockets 68. Thus, the wiper chains 66 at the sides of the forward movement paths are driven by the wiper drive sprockets 68 in the direction indicated by arrow C along the longitudinal direction of the separation tank 12. The respective second wipers 60 are mounted on the wiper chains 66 perpendicularly to the direction of movement of the chains 66 and at a predetermined pitch along the direction of movement of the chains 66. When the wiper chains 66 are driven, the respective second wipers 60 are slid on the surface of the filter member 46 at the side of the liquid outlet in the direction indicated by arrow C. The pitch between the respective second wipers 60 along the direction of movement of the wiper chains 66 is set to be equal to the pitch between the respective first wipers 36 along the direction of movement of the first wiper chains 40. The second wipers 60 and the first wipers 36 are arranged to oppose each other with the filter member 46 interposed therebetween. In other words, the first wipers 36 are interposed between the oil-resistant rubber plate 62 and 63, and the first wipers 36 and the wipers 60 sandwich the filter member from its both sides. The first wipers 36 and the second wipers 60 are respectively driven at the same speed in the directions indicated by arrows B and C, that is, in the same direction by a drive mechanism 39 having the motor 44, the drive sprockets 42, the driven sprockets 43, the drive chains 45, the first wiper chains 40, the transmission chain 72, the second wiper chains 66, the interlocking sprockets 70 and 71, the wiper drive sprockets 68, and the wiper driven sprockets 69. Therefore, the first wipers 36 and the second wipers 60 are slid on the surfaces of the filter member 46 so that they oppose each other with the filter member being interposed therebetween. Reference numeral 74 denotes auxiliarly legs mounted on the support frames 20, and reference numeral 76 denotes a removing member mounted on the frames. After passing through the chute 18, the first wipers 36 are brought into contact with this removing member 76 so that the chips deposited thereon may be removed.

According to the filter apparatus 10 of the arrangement as described above, most of the chips contained in the cutting oil is deposited on the bottom wall of the separation tank 12. The thus deposited chips are scraped by the first wipers 36 and are discharged through the chute 18. Fine chips which did not deposit on the bottom wall of the separation tank 12 and which are floating in the cutting oil are trapped by the filter member 46 en route from the interior of the separation tank 12 to the outlet ports 54. The cutting oil cleaned in the separation tank 12 is supplied to the tank 14 through the outlet ports 54, and may be supplied for reuse.

With the filter apparatus as described above, the fine chips trapped by the filter member 46 and deposited on the surface of the filter member 46 at the side of the liquid inlet are scraped by the first wipers 36 which are slid on the surface of the filter member 46. In this manner, clogging of the through holes of the filter member 46 is prevented. Accordingly, the diameter of the through holes 48 of the filter member 46 can be reduced to improve the filtration performance of the filter member. Moreover, good filtration performance of the filter member can be maintained over an extented period of time.

The filter apparatus 10 of this embodiment has the second wipers 60 which are slid on the surface of the filter member at the side of the liquid outlet. These second wipers 60 and the first wipers 36 are slid over both surfaces of the filter member 46 so that they oppose each other with the filter member 46 interposed therebetween. Therefore, the filter member 46 may not be deformed due to the sliding movement of the second wipers 60 and the first wipers 36. Thus, the filter member 46 need not have a high rigidity, so that the filter member can be made thinner and more through holes 48 may be formed. As a consequence, the filtration performance of the filter member 46 may be further improved. If the filter member 46 is made thinner, the size of the through hole 48 along the axial direction of the through hole 48 is made smaller. This facilitates the scraping effects of the chips within the through holes 48 by the first wipers 36 and the second wipers 60, and clogging of the through holes 48 is further prevented.

Figure 5:
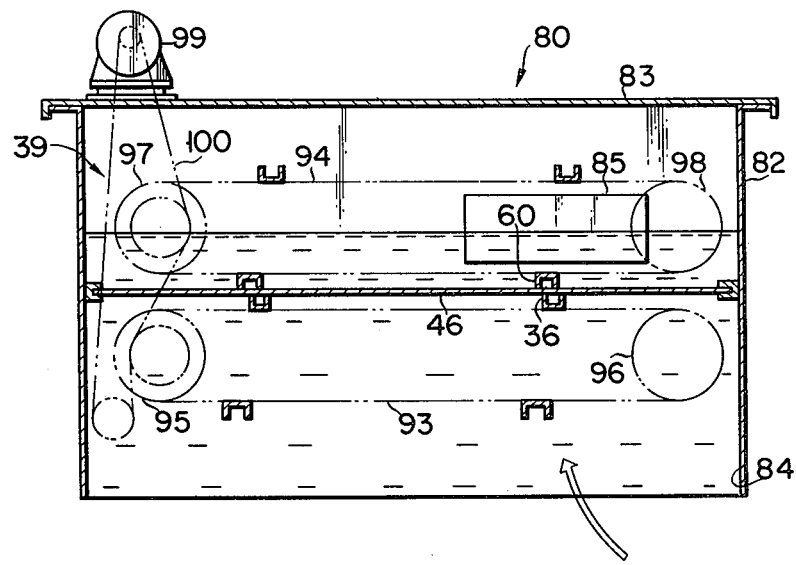
Figure 6:
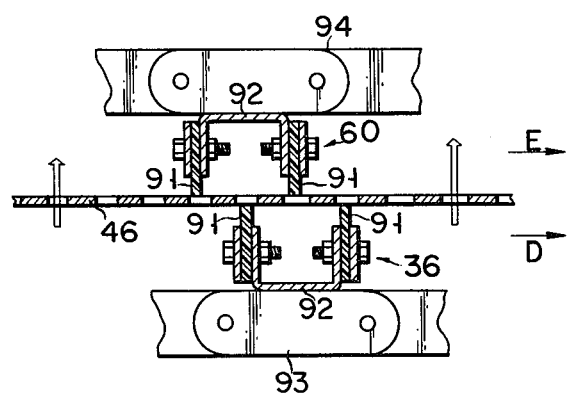

A filter apparatus 80 according to another embodiment of the present invention is shown in FIGS. 5 and 6. This filter apparatus 80 is in a unit form and has a frame 82 of hollow rectangular shape. The upper end of the frame 82 is covered by a lid 83. The frame 82 has an opening 84 through which is introduced the cutting oil containing chips, and an outlet port 85 for discharging the cutting oil introduced inside the frame 82 through the opening 84 to the outside of the frame. The filter apparatus 80 has a filter member 46 which is made of a metal sheet with a number of through holes formed by punching, for example. The filter member 46 is formed in a rectangular form in correspondence with the shape of the frame 82. Between the opening 84 and the outlet port 85, the filter member 46 is suspended on the inner walls of the frame 82 so as to allow the cutting oil to flow therethrough from the opening to the outlet port. The cutting oil flowing to the interior of the frame 82 through the opening 84 is filtered by the filter member 46 and is discharged through the outlet port 85. The discharged cutting oil is supplied to the cleaned liquid holding tank (not shown).

The filter apparatus 80 has a plurality of first wipers 36 which are slidable over the surface of the filter member 46 at the side of the liquid inlet, and a plurality of second wipers 60 which are slidable over the surface of the filter member 46 at the side of the liquid outlet. Each of these first and second wipers has two oil-resistant rubber plates 91 having a length substantially the same as the width of the filter member 46, and a U-shaped support member 92 supporting these oil-resistant rubber plates parallel to each other.

The filter apparatus 80 has, as a driving mechanism 39 for sliding the first and second wipers, a pair of first wiper chains 93 and a pair of second wiper chains 94. The first wiper chains 93 are passed round a pair of first drive sprockets 95 and a pair of first driven sprockets 96 which are rotatably mounted on the inner surfaces of the frame 82 at the liquid inlet side of the filter member 46, respectively. The backward movement path of each first wiper chain 93 extends parallel to the filter member 46. The second wiper chains 94 are passed round a pair of second drive sprockets 97 and a pair of second driven sprockets 98 which are rotatably mounted on the inner surfaces of the frame 82 at the liquid outlet side of the filter member 46, respectively. The forward movement path of each second wiper chain 94 extends parallel to the filter member 46. The filter apparatus 80 further has, as a drive means, a motor 99 mounted on the lid 83, and drive chain 100 which are connected to the motor 99 to be driven thereby. One of the first drive sprockets 95 and one of the second drive sprockets 97 engage with the drive chain 100 to be driven thereby. The first wiper chains 93 are driven by the first drive sprockets 95 along the longitudinal direction of the filter member 46. The second wiper chains 94 are driven by the second drive sprockets 97 along the longitudinal direction of the filter member 46. The backward movement path of each first wiper chain 93 and the forward movement path of each second wiper chain 94 are driven in the directions indicated by arrows D and E at the same speed.

Both ends of each first wiper 36 are mounted on the first wiper chains 93, respectively. The first wipers 36 are arranged at a predetermined pitch along the direction of movement of the first wiper chains 93 and are arranged perpendicularly to the direction of movement of the first wiper chains. The first wipers 36 are driven integrally with the first wiper chains. Both ends of each second wiper 60 are mounted on the second wiper chains 94, respectively. The second wipers 60 are arranged at a predetermined pitch along the direction of movement of the second wiper chains 94 and are arranged perpendicularly to the direction of movement of the second wiper chains. The second wipers 60 are driven integrally with the second wiper chains 94. The pitch between the first wipers 36 along the direction of movement of the first wiper chains 93 is the same as that between the second wipers 60 along the direction of movement of the second wiper chains 94. The first wipers 36 and the second wipers 60 are arranged to oppose each other with the filter member 46 interposed therebetween. Upon the operation of the motor 99, the first and second wipers are slid over both surfaces of the filter member 46 in opposition with each other.

The filter apparatus of the second embodiment of the apparatus has the similar effects as those of the first embodiment. Since the filter apparatus of the second embodiment is in the form of a unit, it may be easily assembled in various types of equipment.

The filtering apparatus of the present invention is not limited to those for filtering cutting oil but may be extended to those for filtering machining oil or slurry. The flexible sheet constituting the filter member may comprise a woven fabric of synthetic resinous fiber. In this case, since the woven fabric is in the form of fine mesh, filtration performance of the filter member is further improved.

What is claimed is:

1. A filter apparatus for filtering a liquid containing solid materials comprising:
   a filter member made of a flexible sheet having a number of though holes which prevent passage of solid materials while allow passage of the liquid thereby filtering the liquid;
   at least one wiper which has an oil-resistant material plate and is slidably arranged over the surface of the filter member on the liquid inlet side to scrape off the solid materials deposited on the surface of the filter member upon sliding movement thereof;
   at least one second wiper which has two oil-resistant material plates and is slidably arranged over the surface of the filter member on the liquid outlet side; and
   driving means for sliding the first and second wipers over the surfaces of the filter member at the same speed and in the same direction so that the first and second wipers sandwich the filter member on both its sides and the first wiper is interposed between the oil-resistant material plates of the second wiper.

2. A filter apparatus according to claim 1 which includes a plurality of first wipers and a plurality of second wipers.

3. A filter apparatus according to claim 2 wherein each of said oil-resistant material plates has a length substantially equal to the width of the filter member, and each of the first wipers has a support member for supporting the oil-resistant material plate, and each of the second wipers has a support member for supporting the oil-resistant material plates substantially parallel to each other.

4. A filter apparatus according to claim 3, which comprises a separation tank into which is introduced the liquid containing solid materials, the separation tank having a bottom wall one end portion of which is inclined upward from the other end portion, two side walls which are faced to each other, support frames which extend from the side walls along the one end portion of the bottom wall and which support the one end portion of the bottom wall, and an outlet port formed in at least one of the side walls to discharge, the liquid introduced in the separationn tank therethrough.

5. A filter apparatus according to claim 4, wherein said filter member has a rectangular form with a width substantially equal to a width of the bottom wall, and the filter member is suspended between the side walls of the separation tank substantially parallel to the bottom wall of the separation tank to allow the liquid to flow therethrough toward the outlet port.

6. A filter apparatus according to claim 5, wherein said driving means has a motor fixed to one of the extended end portions of the support frames, a pair of drive sprockets which are rotatably mounted on the inner surfaces of the extended end portions of the support frames, a drive chain which is coupled to the motor to be driven thereby and which engages with one of the drive sprockets, a pair of driven sprockets which are rotatably mounted on the inner surfaces of the side walls of the separation tank, a pair of first wiper chains which are passed round the drive sprockets and the driven sprockets and which are driven along a longitudinal direction of the separation tank, a forward movement path of each of the first wiper chains extending parallel to the bottom wall and a backward movement path of each of the first wiper chains extending parallel to the filter member at the liquid inlet side of the filter member, a pair of transmission sprockets which are rotatably mounted on inner surfaces of the support frames and which engage with the first wiper chains at the sides of the backward movement paths thereof to be driven thereby, an interlocking sprocket which is coupled to one of the transmission sprockets to be rotated therewith, a pair of wiper drive sprockets and a pair of wiper driven sprockets which are rotatably mounted on the inner surfaces of the side walls of the separation tank at the liquid outlet side of the filter member, an interlocking sprocket which is coupled to one of the wiper drive sprockets to be rotated therewith, a transmission chain passed round the interlocking sprockets and driven along the longitudinal direction of the separation tank, and a pair of second wiper chains which are passed round the wiper drive sprockets and the wiper driven sprockets and which are driven along the longitudinal direction of the separation tank by the transmission chain through the interlocking sprockets and the wiper drive sprockets, a forward movement path of each of the second wiper chains extending parallel to the filter member at the liquid outlet side of the filter member.

7. A filter apparatus according to claim 6, wherein said first wiper chains, at the sides of the backward movement paths thereof, and the second wiper chains, at the sides of the forward movement paths thereof are driven in the same direction at the same speed.

8. A filter apparatus according to claim 7, wherein ends of each of said first wipers are mounted to the respective first wiper chains, and the first wipers are mounted at a predetermined pitch along the direction of movement of the first wiper chains and are mounted perpendicularly to the direction movement of the first wiper chains.

9. A filter apparatus according to claim 8, wherein said first wipers are slidable on the bottom wall of the separation tank at the sides of the forward movement paths of the first wiper chains to scrape the solid materials deposited on the bottom wall, convey the solid material to the one end of the bottom wall, and discharge the solid materials therefrom.

10. A filter apparatus according to claim 9, wherein said first wipers are slid on the surface of the filter member at the liquid inlet side at the sides of the forward movement paths of the first wiper chains.

11. A filter apparatus according to claim 10, wherein ends of each of said second wipers are mounted to the respective second wiper chains, and the second wipers are mounted at a predetermined pitch along the direction of movement of the second wiper chains and are mounted perpendicularly to the direction of movement of the second wiper chains.

12. A filter apparatus according to claim 11, wherein said second wipers are slid on the surface of the filter member at the liquid outlet side at the sides of the forward movement paths of the second wiper chains.

13. A filter apparatus according to claim 12, wherein the predetermined pitch between said first wipers along the direction of movement of the first wiper chains is the same as the predetermined pitch between the second wipers along the direction of movement of the second wiper chains.

14. A filter apparatus according to claim 13, wherein said first and second wipers are arranged to oppose each other with the filter member interposed therebetween.

15. A filter apparatus according to claim 3, which comprises a frame of hollow rectangular shape, the frame having an opening through which is introduced the liquid containing the solid materials, and an outlet port for discharging the liquid introduced into the frame to the outside.

16. A filter apparatus according to claim 15, wherein said filter member is suspended inside the frame between the opening and the outlet port to allow the liquid to flow therethrough from the opening toward the outlet port.

17. A filter apparatus according to claim 16, wherein each of said first wipers has two oil-resistant rubber plates of a length substantially equal to a width of the filter member, and a support member for supporting the oil-resistant rubber plates parallel to each other.

18. A filter apparatus according to claim 17, wherein said driving means comprises a pair of first drive sprockets and a pair of first driven sprockets which are rotatably mounted on the inner surface of the frame at the liquid inlet side of the filter member, a pair of second drive sprockets and a pair of second driven sprockets which are rotatably mounted on the inner surface of the frame at the liquid outlet side of the filter member, a motor mounted to the frame, a drive chain which is coupled to the motor to be driven thereby and which engages with and rotates one of the first drive sprockets and one of the second drive sprockets, a pair of first wiper chains which are passed round the first drive sprockets and the first driven sprockets and which are driven along the longitudinal direction of the filter member by the first drive sprockets, backward movement paths of the first wiper chains extending parallel to the filter member at the liquid inlet side of the filter member, and a pair of second wiper chains which are passed round the second drive sprockets and the second driven sprockets and which are driven in the longitudinal direction of the filter member, forward movement paths of the second wiper chains extending parallel to the filter member at the liquid outlet side of the filter member.

19. A filter apparatus according to claim 18, wherein said first wiper chains, at the sides of the backward movement paths thereof, and the second wiper chains, at the sides of the forward movement paths thereof are driven in the same direction at the same speed.

20. A filter apparatus according to claim 19, wherein ends of each of said first wipers are mounted to the associated first wiper chains, and the first wipers are arranged at a predetermined pitch along the direction of movement of the first wiper chains to be driven therewith and are mounted perpendicularly to the direction movement of the first wiper chains.

21. A filter apparatus according to claim 20, wherein ends of each of said second wipers are mounted on each of the second wiper chains, and the second wipers are arranged at a predetermined pitch along the direction of movement of the second wiper chains to be driven therewith and are mounted perpendicularly to the direction movement of the second wiper chains.

22. A filter apparatus according to claim 21, wherein the predetermined pitch between said first wipers along the direction of movement of the first wiper chains is the same as the pitch between the second wipers along the direction of movement of the second wiper chains.

23. A filter apparatus according to claim 22, wherein said first and second wipers are arranged to oppose each other with the filter member interposed therebetween.

* * * * *